Figure 1:
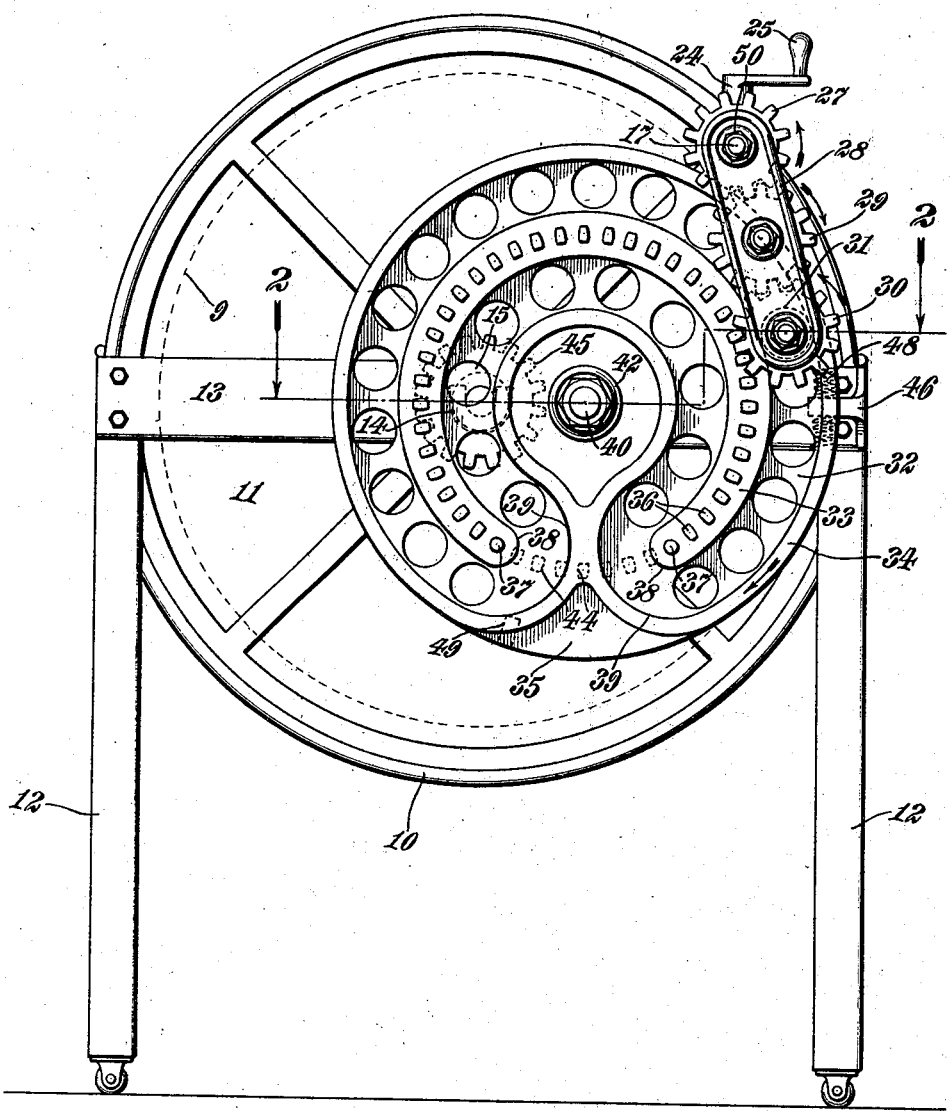

O. G. PFEIFFER.
REVERSING GEARING FOR WASHING MACHINES.
APPLICATION FILED MAY 6, 1915.

1,211,221.

Patented Jan. 2, 1917.
2 SHEETS—SHEET 1.

Inventor:
OTTO G. PFEIFFER,
By John N. Bruninga
His Attorney.

O. G. PFEIFFER.
REVERSING GEARING FOR WASHING MACHINES.
APPLICATION FILED MAY 6, 1915.
1,211,221.
Patented Jan. 2, 1917.
2 SHEETS—SHEET 2.
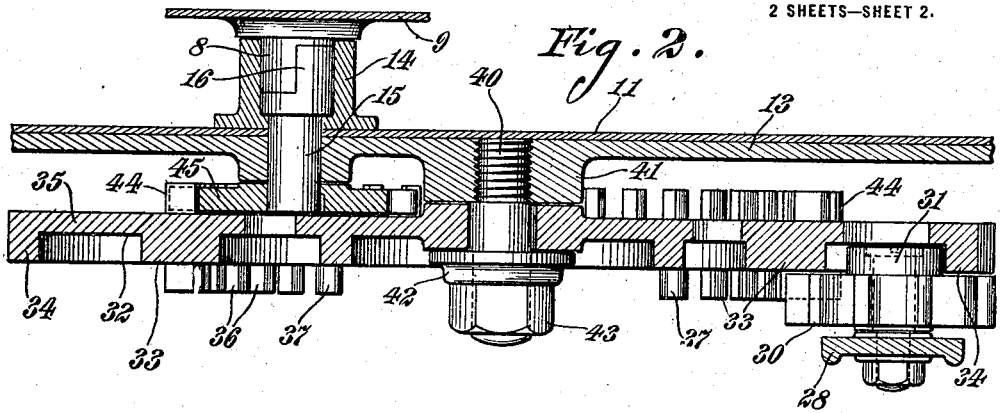
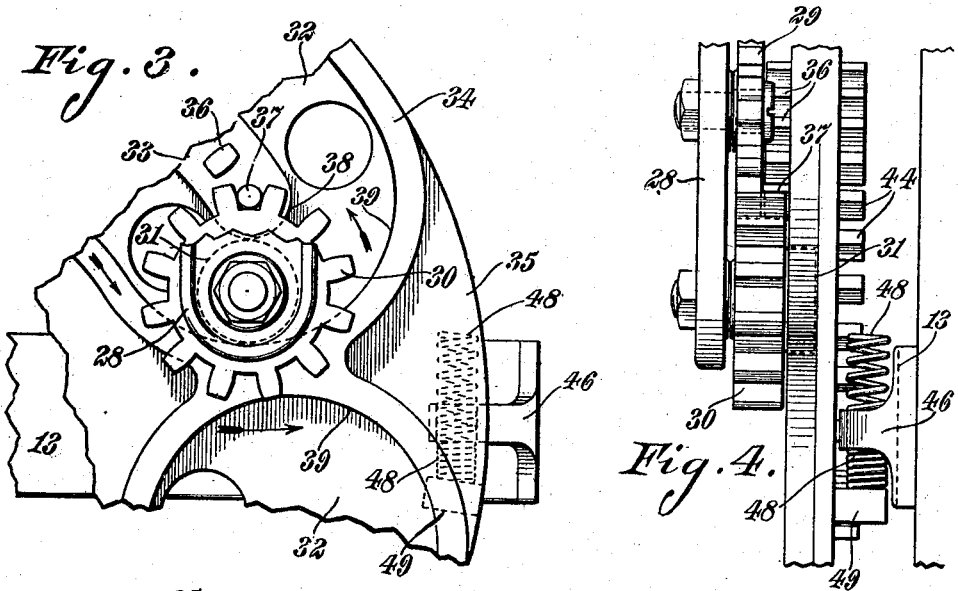
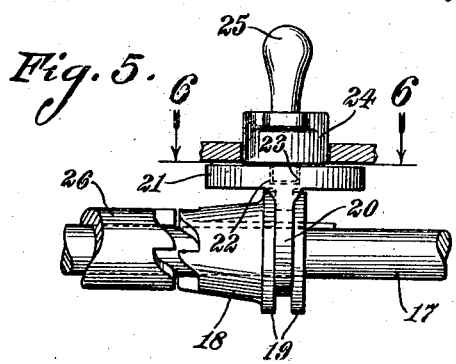
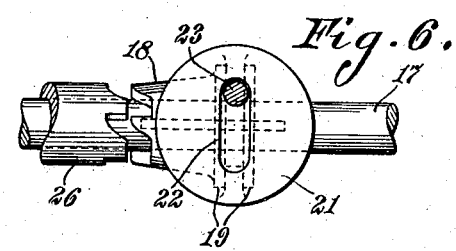
Inventor:
OTTO G. PFEIFFER,
By John N. Bruninga
His Attorney.

UNITED STATES PATENT OFFICE.

OTTO G. PFEIFFER, OF ST. LOUIS, MISSOURI.

REVERSING-GEARING FOR WASHING-MACHINES.

1,211,221.  Specification of Letters Patent.  Patented Jan. 2, 1917.

Application filed May 6, 1915. Serial No. 26,407.

*To all whom it may concern:*

Be it known that I, OTTO G. PFEIFFER, a citizen of the United States, and residing at St. Louis, in the State of Missouri, have invented a certain new and useful Improvement in Reversing-Gearing for Washing-Machines, of which the following is a specification.

This invention relates to driving gearing, and more particularly, to driving gearing for washing machines.

The driven or movable element of a washing machine must be given an alternating rotary movement. To obtain best results the movable element must be given several revolutions before reversal. The simplest form of alternating rotary gearing is one in which a gear element connected with the driven shaft has inner and outer segmental gear faces meshing with a gear connected with the drive shaft. The gear element has, however, heretofore been directly connected with the driven element, so that only a single revolution was obtainable before reversal. This is not satisfactory in a washing machine.

One of the objects of this invention, therefore, is to provide reversing gearing of the type described above by means of which several revolutions may be obtained before reversal.

Another object is to provide a reversing gearing whereby the reversal may be gradual, may be accomplished without shock or jar, and in which the action of the mechanism is positive and certain.

Another object is to provide a reversing gearing which is simple in construction and operation, requires no adjustment, and which is cheap and durable.

Further objects will appear from the detail description taken in connection with the accompanying drawings, in which:

Figure 1 is a side elevation of a washing machine embodying this invention; Fig. 2 is an enlarged section on the line 2—2, Fig. 1; Fig. 3 is an enlarged detail of Fig. 1, but showing the parts in another position; Fig. 4 is a detail side elevation of Fig. 3; Fig. 5 is a detail side elevation of the clutch; and, Fig. 6 is a section on the line 6—6, Fig. 5.

Referring to the accompanying drawings, 10 designates one of the end frames for the casing 11 of the washing machine, this casing being supported on legs 12. A cross beam 13 extends across the end frame, so as to support the driving mechanism, together with the movable element as hereinafter described. The movable element or drum 9 has trunnions 8 mounted in brackets 14 in the end frames, it being understood that there is a bracket 14 mounted on each end frame, and that each bracket is U-shaped, as shown in Fig. 1, so that the drum may be removed. A driven shaft 15 is mounted in the beam 13, and the bracket 14 of this shaft has a coupling 16 adapted for detachable connection with the trunnion 8, the coupling being a fork embracing a key on the trunnion.

A drive shaft 17, operated by a suitable motor, and mounted in the end frames 10, has splined thereon a clutch sleeve 18 provided with a collar 19 engaged by a fork 20 on a disk 21. This disk is provided with a slot 22 engaged by a pin 23 on a shaft 24 rotatable in a cross beam connecting the end frames, and provided with a handle 25, whereby it may be turned. The clutch sleeve 18 is adapted to coöperate with a clutch sleeve 26 connected with a gear 27 loosely mounted on the shaft 17. The shaft 17 has also swinging thereon a frame 28, which has a stub shaft carrying a gear 29, meshing with the gear 27, and a second stub shaft carrying a gear 30, meshing with the gear 29. The stub shaft for the gear 30 has mounted thereon a roll 31, which engages a groove 32 formed by ribs 33 and 34 in a gear element 35. The rib 33 has formed thereon teeth 36 providing internal and external gear faces, the teeth 37 on the ends of the rib 33 being in the form of pins. The ribs 33 and 34 are rounded, as shown at 38 and 39, so as to furnish communication between the exterior and interior parts of the grooves or channel 32. The gear 30 is wider than the gears 29 and 27, so that only this gear will be in mesh with the gear teeth 36.

A stub shaft 40 is mounted in a boss 41 on the beam 13, and forms a support for the gear element 35. This gear element is secured in position by a washer 42 and a nut 43. The inside face of the gear element 35 is provided with teeth 44 meshing with a pinion 45 on the driven shaft 15. A bracket 46 mounted on the beam 13 has fixed thereto a pair of buffer springs 48 adapted to be engaged by a lug 49 projecting from the inside face of the gear element. The gearing may be covered by a suitable casing (not shown). The frame 28 is held against movement on the shaft 17 by the nut 50.

The shaft 17 is driven by a suitable motor (not shown), and this shaft may be clutched to and from the gear 27 by operation of the handle 25. Rotation of the shaft 24 through the handle 25 will cause the pin 23, by engagement with the slot 22, to move the clutch sleeve 18 into engagement with the clutch sleeve 26.

Rotation of the gear 30 in the direction of the arrow, will cause the gear element to rotate in the direction of the arrow, Fig. 1, until the pin 37 comes into engagement with the gear, as shown in Fig. 3. Rotation of the gear element is then reversed, and this continues for nearly a revolution of said element, until the other pin 37 comes into mesh with the gear 30, when the direction is again reversed. The roll 31, bearing in the groove or channel 32, positively guides the swinging frame 28, and positively maintains the gear in engagement with the teeth on the gear element. Alternating movement of the gear element is, therefore, accomplished positively. As the gear element reaches the point of reversal, the lug 49 will engage the spring 48 and compress this spring. This operates not only to gradually stop the gear element, thereby taking up shock and jar and throwing strain off of the gear parts, but also starts the gear element in the reverse direction.

It will be noted that the pinion 45 is of smaller diameter than the gear 44, the proportion being, in this particular case, one to three. A single revolution of the gear element will, therefore, cause a plurality of revolutions of the driven shaft 15, so that the driven shaft and the washing machine drum will make a plurality of revolutions before reversal. This is essential in washing machine constructions, not only because it gives better results in the actual washing operations, but it also has the important advantage in that it permits the gear element 35 to be driven at a fraction of the speed required if this element were mounted directly upon the driven shaft connected to the drum. This gear element can, therefore, be driven very slowly, and on account of this slow speed, the noise, wear and tear, and the shocks due to reversal, will be minimized.

The device is simple in construction and positive in its action. The arrangement whereby a groove is provided for the roll 31, insures a positive engagement between the gear teeth, and a positive reversal.

It will be noted that the gear element is so constructed that it can be cast in one piece, since the slow speed permits cast gears to be used. The resultant device will be cheap to manufacture. The few parts in this mechanism result in simplicity of construction, and since there is no adjustment required it is especially adapted for domestic purposes.

It is obvious that various changes, within the scope of the appended claims, may be made in the details of construction without departing from the spirit of this invention, and it is, therefore, to be understood that this invention is not to be limited to the specific construction shown and described.

Having thus described the invention what is claimed is:

1. In driving gearing for washing machines, a drive shaft, a driven shaft, a gear operated from said drive shaft, a gear element meshing with said gear and adapted to perform an alternating rotary movement, means connecting said gear element with said driven shaft constructed to cause said driven shaft to make a plurality of complete revolutions before reversing, and buffer means coöperating with said gear element at the point of reversal.

2. In driving gearing for washing machines, a drive shaft, a driven shaft, a gear operated from said drive shaft, a gear element mounted eccentrically with respect to said driven shaft and having inner and outer segmental gear faces meshing with said gear, a movable support for said gear, a roll on said support, a track on said gear element guiding said roll, said gear element being provided on its other side with an inside gear face, and a pinion on said driven shaft meshing with the inside gear face of said gear element constructed to cause said driven shaft to rotate a plurality of times before reversing.

3. In driving gearing for washing machines, a drive shaft, a driven shaft, a gear operated from said drive shaft, a gear element mounted eccentrically with respect to said driven shaft and having on one face inner and outer segmental gear faces meshing with said gear, an inside gear face on the other side of said gear element, and a pinion on said driven shaft meshing with said inside gear face.

4. In driving gearing for washing machines, a drive shaft, a driven shaft, a gear operated from said drive shaft, a gear element having on one face inner and outer segmental gear faces meshing with said gear, a movable support for said gear, a roll on said support, a track on said gear element guiding said roll, a gear face on the other side of said gear element, and a pinion connected with said driven shaft and meshing with said second gear face.

5. In driving gearing for washing machines, a drive shaft, a driven shaft, a gear operated from said drive shaft, a gear element mounted eccentrically with respect to said driven shaft and having on one face inner and outer segmental gear faces meshing with said gear, a movable support for said gear, a roll on said support, a track on said gear element guiding said roll, a gear face on the other side of said gear element, and a pinion on said driven shaft meshing with said second gear.

In testimony whereof I affix my signature this fourth day of May, 1915.

OTTO G. PFEIFFER.